United States Patent
Uno et al.

[11] Patent Number: 6,084,854
[45] Date of Patent: Jul. 4, 2000

[54] ATM SWITCHING NETWORK FOR SETTING PLURAL COMMUNICATION CHANNELS AMONG SUBSCRIBERS, AND ATM SWITCHING APPARATUS USED IN ATM SWITCHING NETWORK

[75] Inventors: Hiroto Uno, Fujisawa; Hiroyuki Fujitani, Yokohama; Nobuhiko Ido, Yokohama; Kazuhiko Haru, Yokohama, all of Japan

[73] Assignee: Hitachi, Ltd., Tokyo, Japan

[21] Appl. No.: 08/722,850

[22] Filed: Sep. 26, 1996

[30] Foreign Application Priority Data

Sep. 27, 1995 [JP] Japan .................................. 7-249659

[51] Int. Cl.⁷ .............................. H04L 12/28; H04L 12/56
[52] U.S. Cl. ......................... 370/232; 370/253; 370/397; 370/420
[58] Field of Search ...................... 370/229–237, 370/389, 395, 396, 397, 410, 412, 419, 420, 426, 465, 468, 522, 252, 253, 537; 340/825, 825.01, 825.03, 825.06

[56] References Cited

U.S. PATENT DOCUMENTS

| | | | |
|---|---|---|---|
| 5,267,232 | 11/1993 | Katsube et al. | 370/230 |
| 5,519,689 | 5/1996 | Kim | 370/232 |
| 5,535,196 | 7/1996 | Aihara | 370/395 |
| 5,623,492 | 4/1997 | Teraslinna | 370/397 |
| 5,694,390 | 12/1997 | Yamato et al. | 370/230 |
| 5,715,237 | 2/1998 | Akiyoshi | 370/228 |
| 5,835,484 | 11/1998 | Yamato et al. | 370/232 |
| 5,862,126 | 1/1999 | Shah et al. | 370/230 |

OTHER PUBLICATIONS

Pictorial Explanations on B–ISDN, OHM Co., Ltd., 1993, pp. 64–71.

*Primary Examiner*—Seema S. Rao
*Attorney, Agent, or Firm*—Antonelli, Terry, Stout & Kraus, LLP

[57] ABSTRACT

In an ATM switching network, a limitation of traffic in an ATM switching apparatus is relaxed. In an ATM switching network capable of allocating a plurality of communication channels to a terminal unit of one subscriber, when the terminal of this subscriber requests setting of the plural communication channels, a traffic amount of the communication channels proposed to the ATM switching apparatus is declared as a total amount of the respective communication channels. The ATM switching apparatus measures a total traffic amount of the plural communication channels set in response to the request made by the terminal unit, and limits the traffic of the plural set communication channels in such a manner that the measured traffic amount becomes lower than, or equal to the traffic amount declared through the terminal unit. The subscriber terminal unit can increase the traffic of the respective communication channels within such a range that a total traffic amount during transmission does not exceed the proposed traffic amount.

13 Claims, 7 Drawing Sheets

ATM SWITCHING NETWORK FOR SETTING PLURAL COMMUNICATION CHANNELS AMONG SUBSCRIBERS, AND ATM SWITCHING APPARATUS USED IN ATM SWITCHING NETWORK

BACKGROUND OF THE INVENTION

The present invention generally relates to a communication network (ATM switching network) with employment of the ATM (Asynchronous Transfer Mode) switching system, and more specifically to such an ATM switching network that in response to a call issued or originated from a subscriber, an ATM switching apparatus sets a plurality of communication channels between this subscriber and other subscribers.

ATM switching networks capable of increasing line utilizing efficiencies and information transfer speeds by switching and transferring the information derived from terminals of subscribers in units of cell have begun to be practically utilized. As to the conventional techniques in this ATM switching network, a B-ISDN (Broadband ISDN) switch network will now be explained in the specification.

In the B-ISDN switching network, a service called as a "multiconnection" is provided which sets a plurality of connections among subscribers. Also, in this switching network, any of these subscribers have the obligation to declare traffic amounts when connections are set. Thus, any of these subscribers who intend to have the multiconnection services individually declare each traffic amount of a plurality of traffic amounts to be set, and then data in the respective connections is transmitted/received within the range of the declared traffic amount.

Further, an ATM switching apparatus of this switching network is equipped with a so-called "usage parameter control" function in order to manage traffics from subscribers. In accordance with this function, the traffic amount is measured in units of connection regardless of whether or not the traffic to be controlled is caused by the multiconnection. In such a case that this measurement result exceeds the declared traffic amount, this traffic is limited.

It should be noted that a detailed description about the ATM switching network of B-ISDN is made in "Pictorial Explanations on B-ISDN" published by OHM Co., Ltd, in 1993, pages 64 to 71.

As previously described, according to the prior art ATM network, the traffic amounts of the respective connections among the plural connections set by the multiconnection service are limited to the traffic amounts declared by the subscriber, so that there is no flexibility in adjustments of these traffic amount among these connections. As a result, in such a case that a traffic happens to occur in a burst mode and therefore such a traffic whose traffic amount exceeds the proposed capacity will occur in a certain connection, a portion of this traffic should be allocated to other connections on the subscriber side. Otherwise, predicting that such a burst mode traffic happens to occur, the subscriber should declare the excessive traffic amount with respect to each of these connections. However, there is such a drawback in the above-explained manner for allocating a portion of the traffic to other connections that the work loads processed by the terminal unit of the subscriber are increased. Furthermore, there is such a limitation that this manner cannot be applied to a certain sort of data. That is, for instance, moving picture/image data which is processed in real time cannot be subdivided into a plurality of connections, and then these subdivided moving picture/image data cannot be transferred. On the other hand, another method for proposing such an excessive traffic amount would allocate the excessive transmission band to the subscriber. Accordingly, the contract fee for the multiconnection service to the subscriber is increased, and at the same time, the utilization efficiency of the ATM network is lowered.

Also, according to the IIU-T (International Telecommunication Union-Telecommunication Sector) recommendation, there is no rule that setting of plural connections in a multiconnection is realized by a single call originating signal. As a consequence, such a subscriber who intends to receive a multiconnection service should transmit the call originating signal with respect to each connection under present conditions.

SUMMARY OF THE INVENTION

Therefore, it is an object of the present invention to provide an ATM switching network in which a limitation in traffic of an ATM switching apparatus is made with higher flexibility.

Also, another object of the present invention is to provide an ATM switching network in which setting of plural connections in an ATM switching apparatus can be more simply instructed by a subscriber.

An ATM switching network, according to one aspect of the present invention, is constructed of terminal units each provided with one of plural subscribers; and ATM switching apparatuses which connect these terminals to each other via a communication line or circuit. This ATM switching apparatus is such an ATM switching network for setting a plurality of communication channels between the terminal unit of the above-described subscriber and a terminal unit of another subscriber in response to either first call information set to a call originating signal supplied from the terminal, or another call originating signal supplied from a transit ATM switching apparatus. The terminal unit includes means for setting second call information to this call originating signal and when the call originating signal to which the first call information has been set is outputted, second call information indicative of a total traffic amount per unit time of the plural communication channels is set to the call originating signal in response to this call originating signal. The ATM switching apparatus includes means for measuring the total traffic amount per unit time in the plurality of set communication channels and means for limiting the traffic of the plurality of set communication channels. When the first call information has been set to either the call originating signal supplied from the terminal unit or the call originating signal supplied from the transit ATM switching apparatus, the traffic of the plurality of set communication channels is limited in such a manner that the measured total traffic amount becomes lower than, or equal to the total traffic amount indicated by the second call information.

Note that the above-described second call information is also referred to as "third call information" in some of the pending claims.

An ATM switching network, according to another aspect of the present invention, is constructed of terminal units one provided with each of plural subscribers; and ATM switching apparatuses which connect these terminals to each other via a communication line or circuit. This ATM switching apparatus is such an ATM switching network that sets a plurality of communication channels between the terminal unit of the above-described subscriber and a terminal unit of another subscriber in response to first call information set to a call originating signal supplied from the terminal, or another call originating signal supplied from a transit ATM switching apparatus. The terminal unit includes means for setting third call information to this call originating signal and when the call originating signal to which the first call information has been set is outputted, the third call information for designating all of the communication channels which are required to be set is set to this call originating signal. The ATM switching apparatus includes means for collectively and simultaneously setting a plurality of communication channels. When the first call information has been set to either the call originating signal supplied from the terminal unit or the call originating signal supplied from the transit ATM switching apparatus, the plurality of communication channels are collectively and simultaneously set in response to the third call information set to the call originating signal.

Note that the above-described second call information is also referred to as "third call information" in some of the pending claims.

With the above-explained arrangement, the terminal of the subscriber can increase the traffic of each communication channel within such a range that the total traffic amount in the plural set communication channels does not exceed the amount indicated by the second call information set to the call originating signal.

Also, the subscriber terminal can collectively designate all of the communication channels which are required to be set by this subscriber, based on the third call issuing information set to the call originating signal.

BRIEF DESCRIPTION OF THE DRAWINGS

For a complete understanding of the present invention, reference is made of a detailed description to be read in conjunction with the accompanying drawings, in which.

DESCRIPTION OF THE PREFERRED EMBODIMENTS

Referring now to drawings, various embodiments of the present invention will be described. It should be noted that the same reference numerals will be employed as those for denoting the same or similar elements throughout the drawings.

Figure 1:
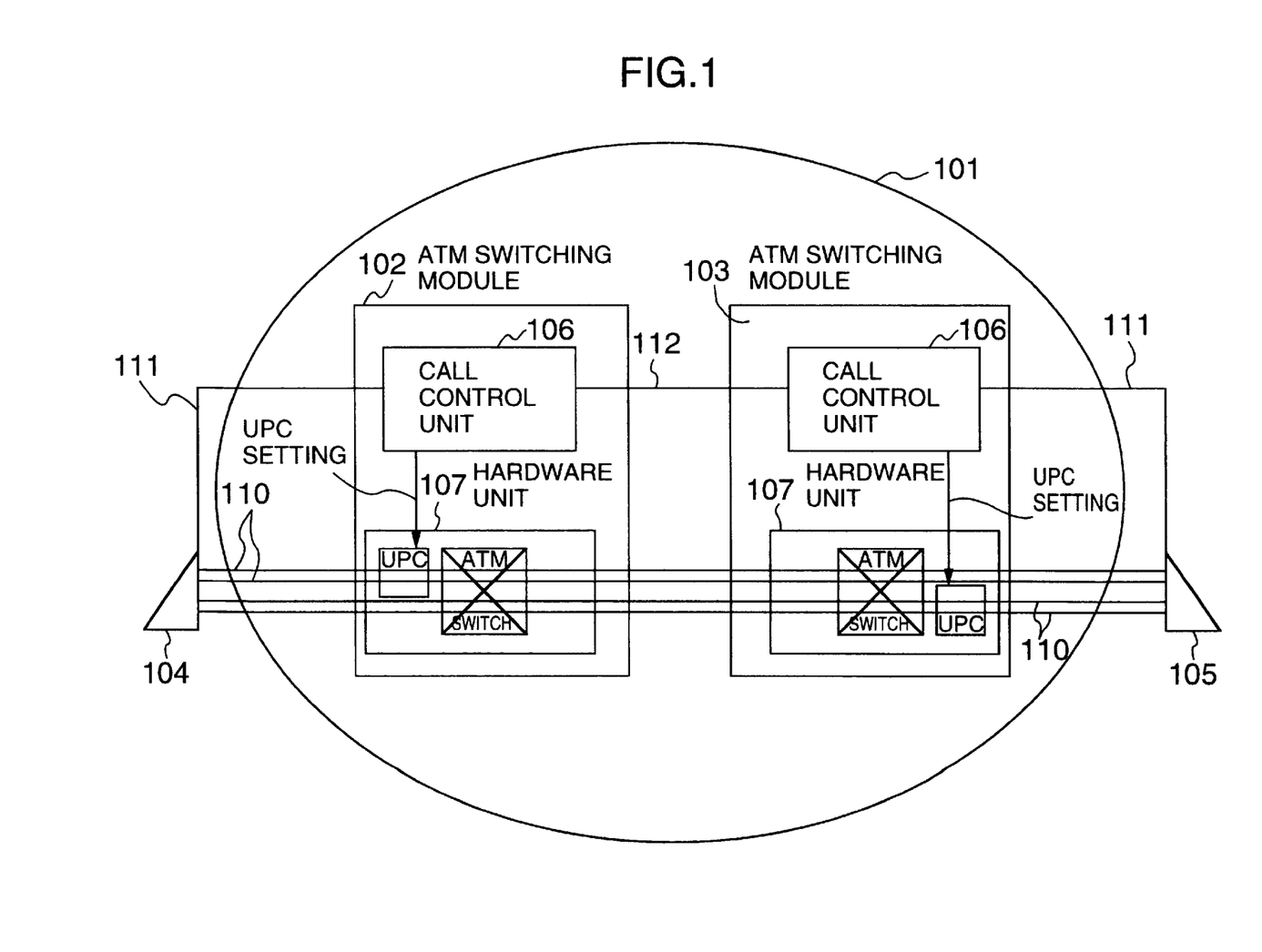
FIG. 1 schematically indicates a conceptional drawing of an ATM switching network according to an embodiment of the present invention.

FIG. 1 is a conceptional drawing of a B-ISDN ATM (Asynchronous Transfer Mode) switching network according to an embodiment of the present invention. In this drawing, two speech connections or communication connections 110 with respect to one direction are set between subscriber terminals 104 and 105, which are connected to each other via an ATM switching network 101. This connection setting is carried out by two ATM switching modules or apparatuses 102 and 103 employed in the ATM switching network 101. It should also be noted that a total number of speech connection is not limited to 2.

Figure 2A:
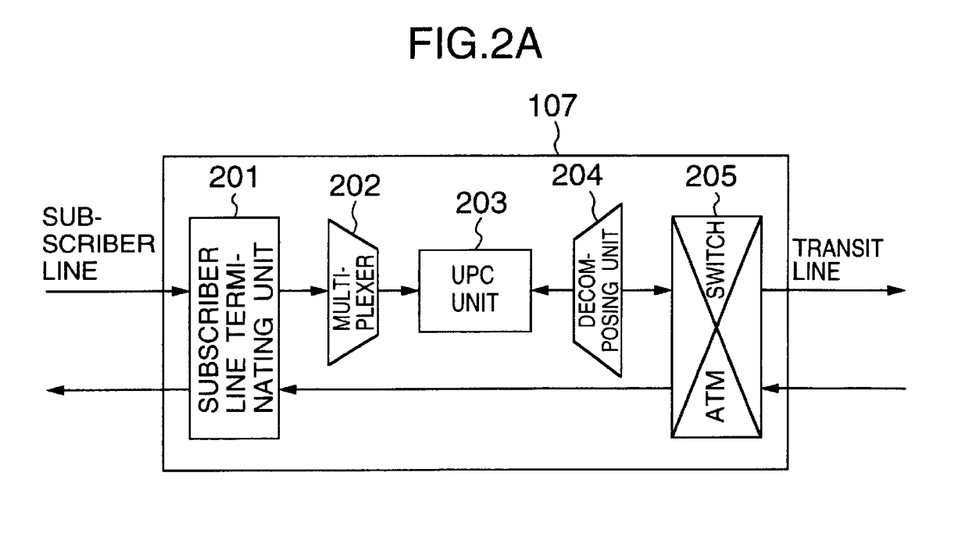
FIGS. 2A, 2B and 2C schematically show functions of hardware units employed in the ATM switching apparatus of FIG. 1.
Figure 2B:
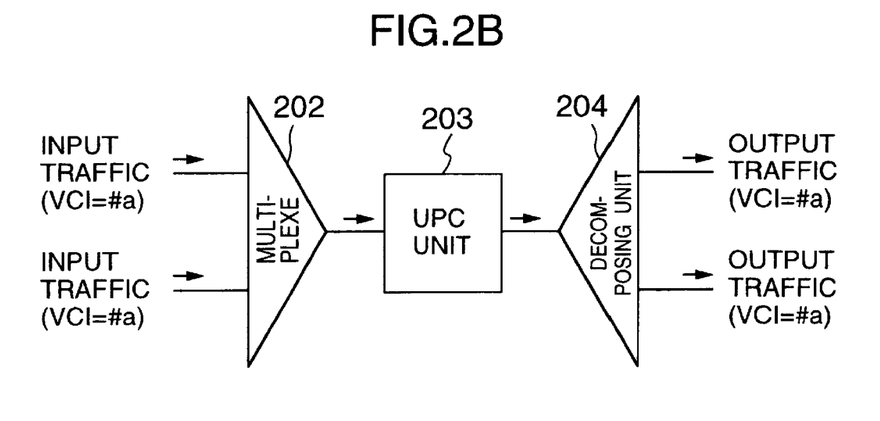
Figure 2C:
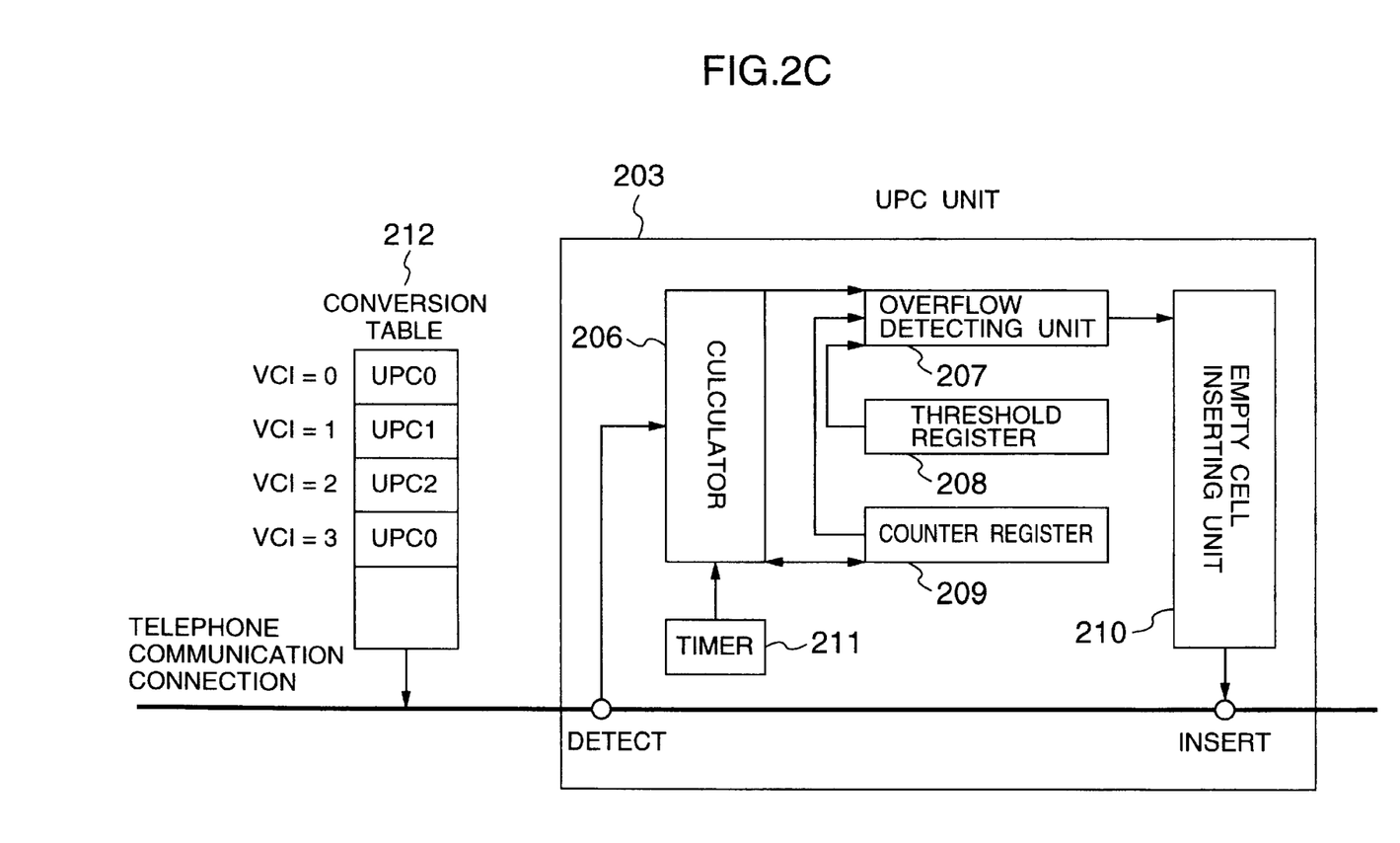

In the arrangement of FIG. 1, the ATM switching module 102 is arranged by a call control unit 106 for monitoring a call issued or originated from a subscriber in accordance with a control program, and a hardware unit 107 for actually switching/limiting calls issued from the subscribers. FIGS. 2A, 2B and 2C represent the structure of this hardware unit 107 more in detail. As indicated in FIG. 2A, the hardware unit 107 is constructed of a subscriber line terminating unit 201 for transmitting/receiving a signal between this hardware unit 107 and a subscriber terminal every connection, a multiplexing unit 202 for multiplexing a signal inputted into the subscriber line terminating unit every connection, and an UPC (Usage Parameter Control) unit 203 for measuring a traffic amount of the multiplexed signal every unit time and for limiting the traffic in accordance with the measurement result. This hardware unit 107 is further arranged by a decomposing unit 204 for decomposing the signal outputted from the UPC unit to again obtain the signal every original communication channel, and an ATM switch 205 for performing a switching process to the signals of the respective communication channels under control of a routing or path selecting unit (not shown).

Figure 3A:
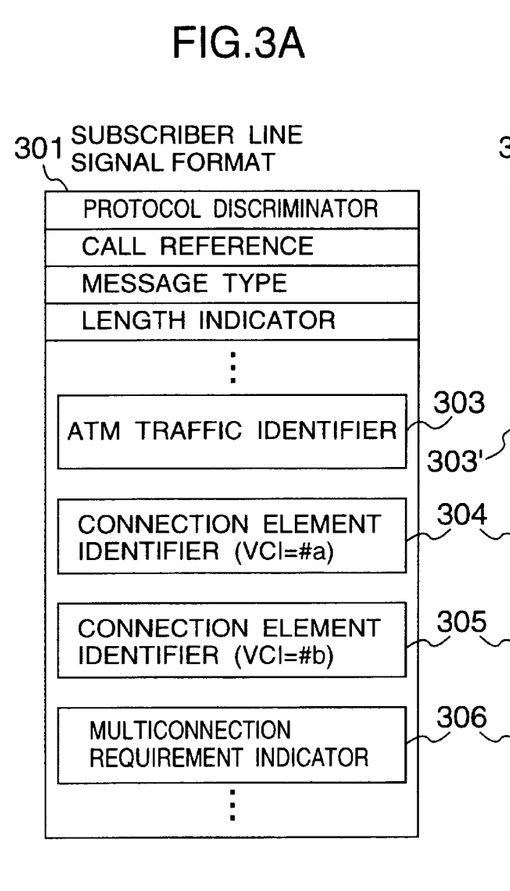
FIGS. 3A and 3B represents formats of call originating signals transferred within the ATM switching network when the multiconnection is set.
Figure 3B:
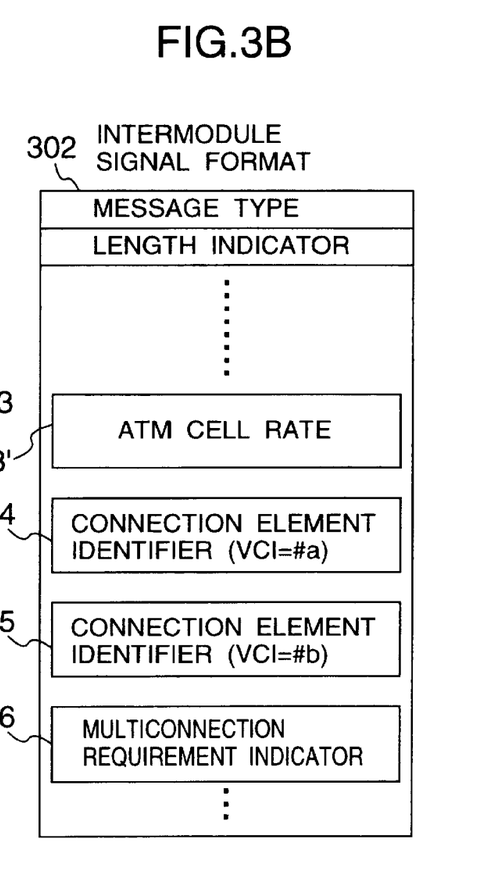

FIG. 3A and FIG. 3B are diagrams for indicating formats of call originating signals transferred within the ATM switching network when the respective multi-connections are set. FIG. 3A represents a format 301 of a call originating signal sent out from a subscriber terminal, and FIG. 3B shows a format 302 of a call originating signal transferred between the ATM switching apparatuses. As indicated in FIG. 3A and FIG. 3B, a parameter (multiconnection request indication 306) indicative of a request item of a multiconnection is set to the call originating signal transferred in the ATM switching apparatus in addition to such parameters as the ATM traffic identifier or descriptor 303, the ATM cell rate 303', the connection element identifiers 304 and 305 and the like, which are presently defined under ITU-T (International Telecommunication Union-Telecommunication Sector). The multiconnection requirement indicator 306 contains data indicative of an indication of a multi-connection (first call information), and data representative of a total amount of traffic amounts about a plurality of communication channels set by the multiconnection (second call information). Also, the connection identifiers 304 and 305 (third call information) are set in the same number as the communication channels set by the multiconnection.

Figure 4:
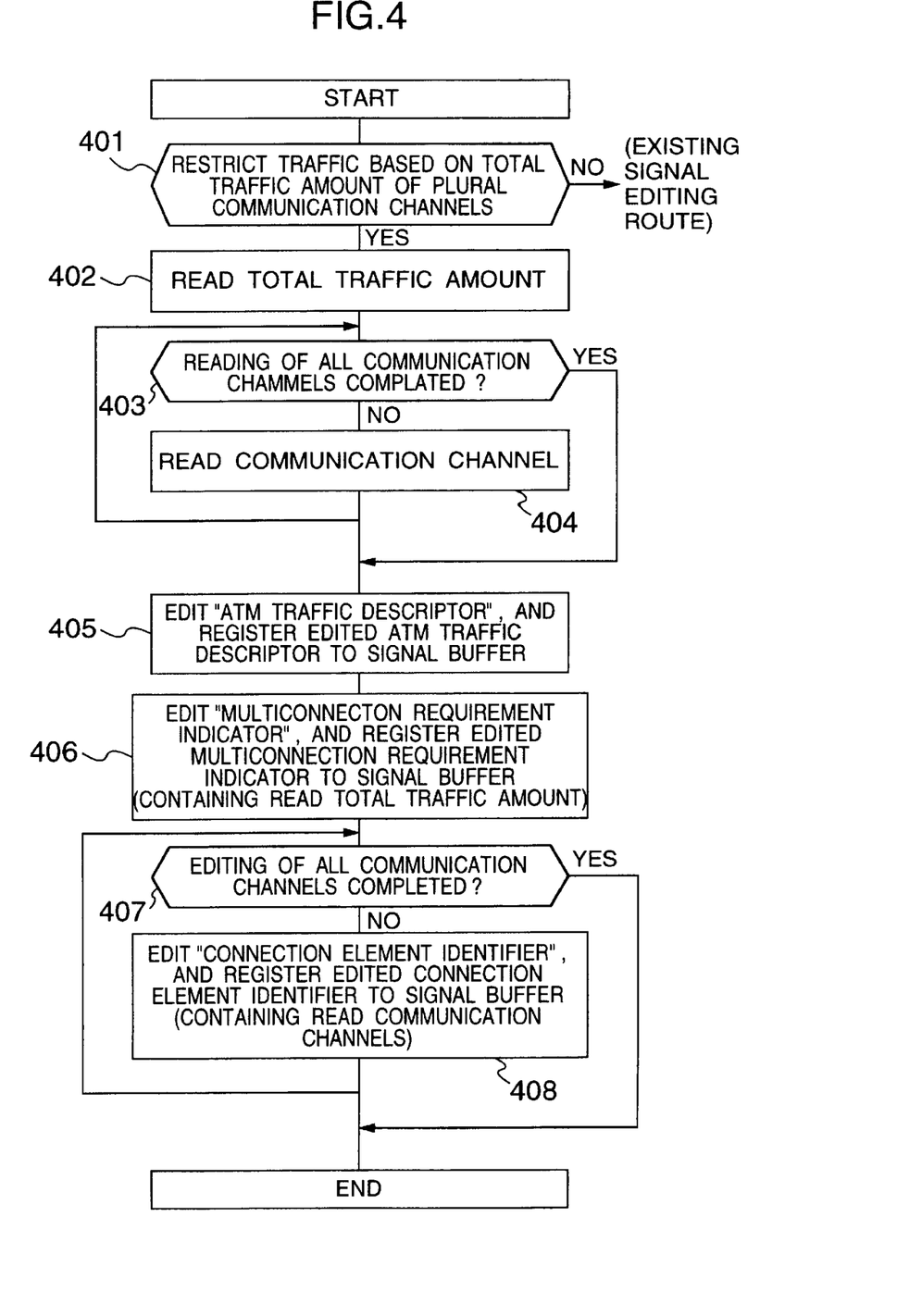
FIG. 4 is a flow chart for describing a multi-connection setting request while call originating signals are produced at the subscriber terminal of FIG. 1.

FIG. 4 is a flow chart for showing a portion related to the multiconnection at the terminal 104 for the call originating subscriber during the production of the call originating signal in the ATM switching network of FIG. 1.

Figure 5:
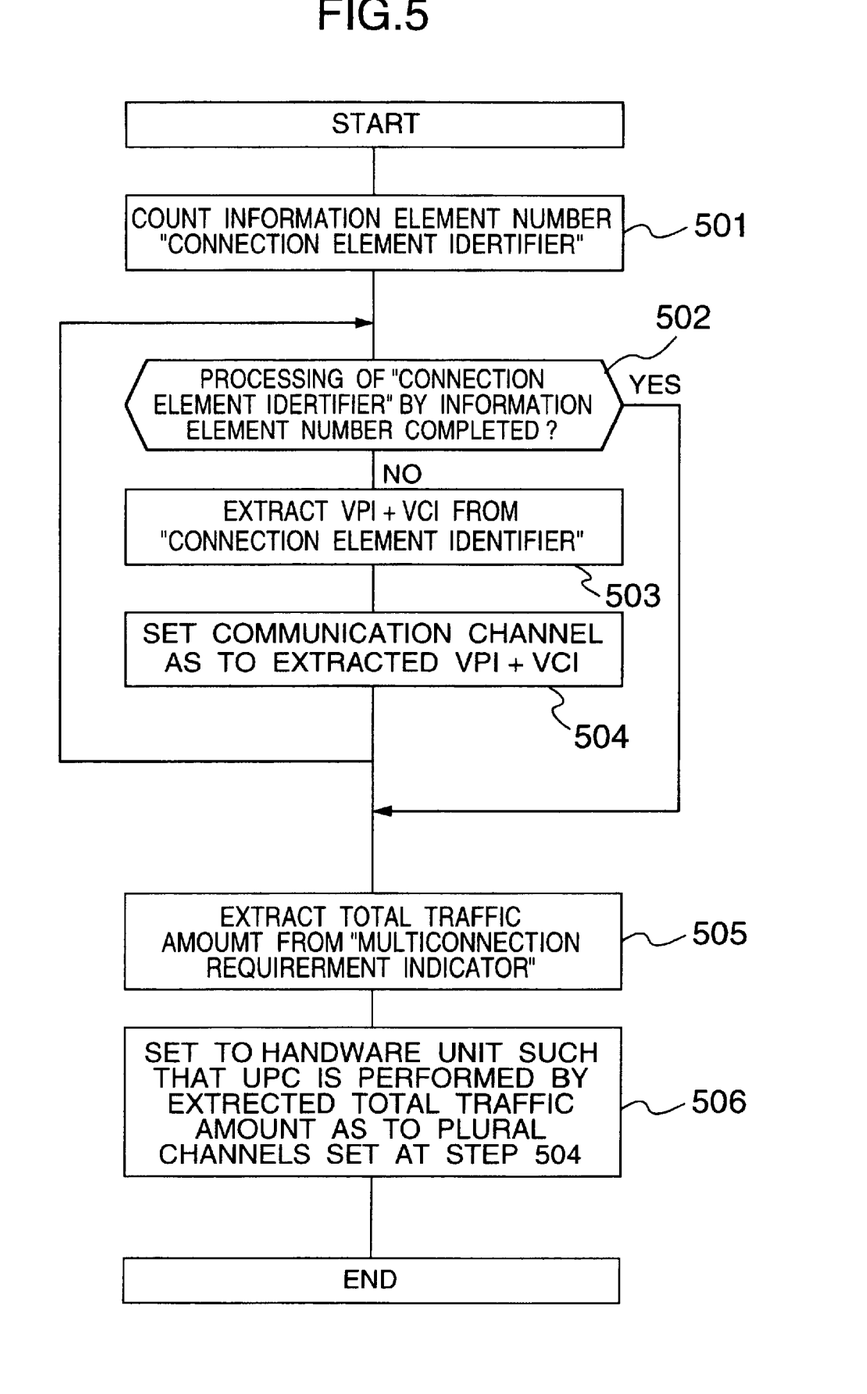
FIG. 5 is a flow chart for describing a collective setting operation of plural communication channels in the ATM switching apparatus of FIG. 1.

FIG. 5 is a flow chart for describing collective-setting operations of the plural communication channels in the ATM switching modules 102 and 103 in the ATM switching network of FIG. 1.

Now, operations of the respective apparatuses employed in the ATM switching network of FIG. 1 will be explained.

First, the subscriber terminal 104 for requesting setting of the multiconnection produces the call originating signal having the format 301 shown in FIG. 3A.

The producing operation of this call originating signal is carried out in accordance with the flow chart shown in FIG. 4. First, in this flow chart, a selection is made as to whether or not a traffic limitation based on a total traffic amount of the plural channels is carried out (step 401). When this traffic limitation is to be performed, the terminal apparatus 104 reads the above-described total traffic amount (step 402), and also reads a designation of plural channels (steps 403 and 404) to be set. Thereafter, the respective information elements such as the ATM traffic descriptor 303, the connection element identifiers 304 and 305, and the multiconnection requirement indicator 306 are edited based on these values, and then the edited information elements are stored into a signal buffer (not shown) (steps 405 to 408). It should also be noted that since a hardware structure for executing the sequential operation defined in this flow chart of FIG. 4 may be readily realized by well-known computer techniques in the art, no explanation of the hardware structure is required.

The call originating signal which has been produced in this manner is transmitted via a subscriber line signalling link 111 to the ATM switching module 102. As a result, the subscriber terminal 104 designates all of two speech connections 110 which are required to be set in response to a single call originating signal with respect to the ATM switching module 102. At the same time, the traffic amount of the speech connection 110 is declared by a total traffic amount of two connections.

In the ATM switching module which receives the call originating signal, the call control unit 106 identifies the various sorts of parameters set to the received call originating signal, and also executes various setting operations to the hardware unit 107 in response to this identification result. Then, the hardware unit 107 simultaneously sets two communication or speech channels designated by the two connection element identifiers in accordance with the setting operation.

This setting operation is executed in accordance with the flow operation of the flow chart indicated in FIG. 5. In this flow chart, designations of plural channels set by the connection element identifiers 304 and 305 contained in the call originating signal are extracted (steps 501 to 503), and then these plural communication channels are set (step 504).

Subsequently, a designation of a total traffic amount indicated by the multiconnection requirement indicator 306 (step 505), and the hardware unit 107 is set in such a manner that UPC (Usage Parameter Control) is carried out for a plurality of set channels based upon this total traffic amount (step 506). It should be understood that since the hardware structure used to execute the sequential operation shown in this flow chart may be readily realized by well-known computer techniques, no explanation of the hardware structure is necessary.

Also, the call control unit 106 produces a call originating signal having the format 302 indicated in FIG. 3B in response to the received call originating signal, and then transmits the produced call originating signal via an intermodule signalling link 112 to the ATM switching module 103. This ATM switching module 103 produces another call originating signal as indicated in FIG. 3A in response to the received call originating signal. Then, this ATM switching module 103 sends this produced call originating signal to the subscriber terminal 105, and also sets two communication channels designated by the connection element identifiers between the subscriber terminal 105 on the call receiving terminal and the ATM switching module 103 in a manner similar to that the ATM switching module 102 sets the two communication channels between the subscriber terminal 105 and this switching module 102.

Subsequently, in the ATM switching module 102, the multiplexing unit 202 multiplexes the traffics sent from the subscriber terminal 104 via the two set communication channels (see FIG. 2B).

This multiplexing operation is carried out in such a manner that, as illustrated in FIG. 2C, two communication channels (in this case, VCI=0 and 3) are allocated to the same UPC subject (in this case, UPC0) by way of a conversion table 212.

The UPC unit 203 measures the traffic amount of the multiplexed signal by way of a so-called "leaky backet mechanism", and reduces the traffic amount by discarding a portion of cells contained in the traffic when this measurement result exceeds the traffic amount set to the multiconnection requirement indicator 306. In other words, a calculator 206 increments a value of a counter register 209 upon arrival of a cell. If the value of the counter register 209 is not equal to 0 when a periodic operation by a timer 211 is initiated, then the calculator 206 decrements this value of the counter register 209, so that a traffic amount per unit time is set to the counter register 209. An overflow detecting unit 207 compares the value of the counter register 209 with a threshold value of a threshold value register 208 set based upon the multiconnection requirement indicator 306 every time the value of the counter register 209 is incremented. When the value of the counter register 209 exceeds the threshold value of the threshold value register 208, the overflow detecting unit 207 initiates an empty cell inserting unit 210 to thereby substitute the incoming cell for an empty cell.

Then, the multiplexed signal processed in the UPC unit 203 is decomposed into the signals for the respective original communication channels by the decomposing unit 204. Thereafter, the decomposed signals are switching-processed by the ATM switch, and then the switching-processed signals are transmitted via the speech connection 110 to the ATM switching module 103. On the other hand, the ATM switching module 103 executes a traffic control operation similar to the traffic control operation performed by the ATM switching module 102 with respect to a signal transmitted from the subscriber terminal 105 on the call receiving side.

As described above, in accordance with this embodiment, the subscriber terminal can increase the traffic of each of the communication channels within such a range that a total traffic amount during the transmission does not exceed the declared traffic amount. In other words, the limitations in the traffic amount as to each of the communication channels are relaxed, as compared with conventional ATM switching systems. Also, since the subscriber terminal can designate all of the speech connections in the multiconnections by way of a single call originating signal, this embodiment system can avoid such a conventional operation that the call originating signals should be individually outputted with respect to the respective connections to be set.

It should be noted that although the two sets of terminals and the two sets of ATM switching modules are utilized in this embodiment, a single subscriber may execute the above-described communication by employing a plurality of terminals for the single subscriber. Further, one or a plurality of transit ATM switching units may be interposed between the above-described ATM switching modules 102 and 103. Furthermore, the above-explained communication may be performed by employing only the ATM switching module 102 without the other ATM switching module 103. This embodiment will now be described with reference to FIG. 6.

Figure 6:
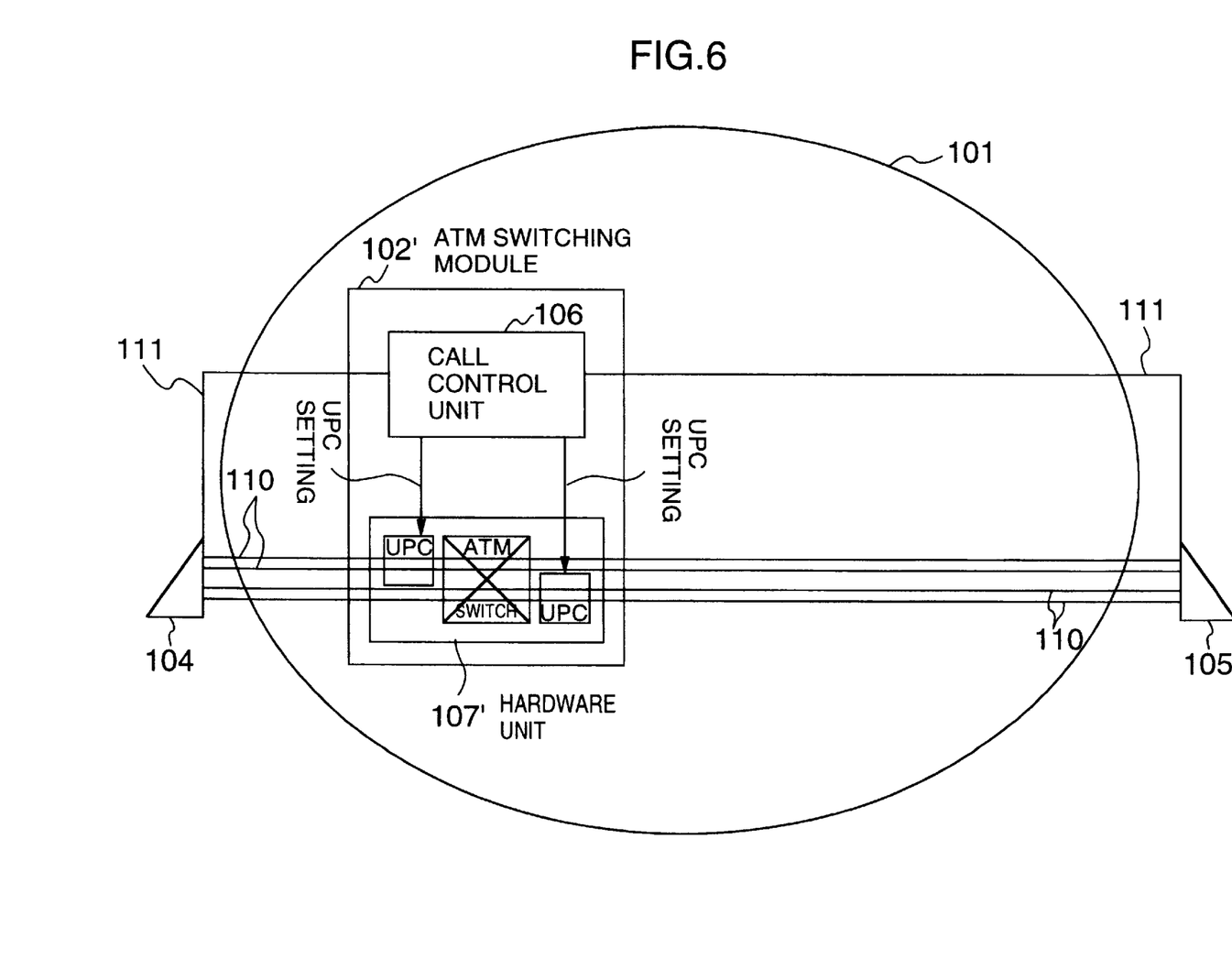
FIG. 6 is a schematic block diagram for an ATM switching network in which setting of communication connections is carried out by a single ATM switching apparatus, according to another embodiment of the present invention.

In FIG. 6, there is shown an arrangement such that a telephone communication connection between the subscriber terminals 104 and 105 is set by a single ATM module 102' employed in the ATM switching network 101. Also in this arrangement, the ATM switching network 101 executes a similar operation to that of FIG. 1 except that there is no signal transmission/reception between ATM switching modules. It should be noted that the UPC unit is provided on both sides of the call-originating subscriber terminal 104 as well as the call-receiving subscriber terminal 105 within a hardware unit 107' of the ATM switching module 102'. This ATM switching module 102' produces the call originating signal as shown in FIG. 3A in response to the call originating signal received from the call-originating subscriber terminal 104 to thereby transmit this produced call originating signal to the subscriber terminal 105. Also, this ATM switching module 102'sets two communication channels designated by the connection element identifiers between the call-receiving subscriber terminal 105 and the ATM switching module 102'. As a consequence, the communication is available between the subscriber terminals 104 and 105.

It should be understood that the present invention may be applied to a non-B-ISDN ATM communication network.

In accordance with the present invention, it is possible to provide such an ATM switching network that restrictions or limitations to the traffic of the ATM switching modules can be further relaxed.

Also, it is possible to provided such an ATM switching network that a plurality of connections in the ATM switching modules can be more simply instructed by the subscriber.

What is claimed is:

1. An ATM switching network for setting a plurality of communication channels between terminals of subscribers, comprising:

a plurality of terminals, wherein at least one is provided for each of plural subscribers; and at least two ATM switching apparatuses, each accommodating at least one of said terminals, for connecting said terminals to each other via a communication line, said ATM switching apparatuses being interconnected so as to be capable of communicating with each other;

wherein each of said terminals comprises:

means for producing at least one call originating signal containing first call information for indicating that a plurality of communication channels are to be set between a terminal of interest and another terminal, and means for setting second call information representative of a total traffic amount per unit time of said plural communication channels to said call originating signal;

wherein one of said ATM switching apparatuses accommodating said terminal of interest comprises:

means for measuring said total traffic amount per unit time in said plurality of set communication channels in response to said first call information contained in said call originating signal supplied from said terminal of interest, means for limiting the traffic of said plurality of set communication channels in such a manner that the measured total traffic amount becomes lower than, or equal to, the total traffic amount indicated by said second call information, means for setting said plurality of communication channels between said terminal of interest and said one of said ATM switching apparatuses accommodating said terminal of interest in response to said call originating signal, and means for producing another call originating signal having said first call information and said second call information and sending out said another call originating signal to one of said ATM switching apparatuses accommodating said another terminal; and wherein said one of said ATM switching apparatuses accommodating said another terminal comprises:

means for setting said plurality of communication channels between said one of said ATM switching apparatuses accommodating said another terminal and said another terminal in response to said another call originating signal.

2. An ATM switching network as claimed in claim 1 wherein said means for measuring the total traffic amount comprises:

means for multiplexing cells sent from said terminal of interest in said plurality of set communication channels; and means for measuring a traffic amount of the multiplexed cell per unit time.

3. An ATM switching network as claimed in claim 1, further comprising:

at least one transit ATM switching network arranged between said at least two ATM switching apparatuses.

4. An ATM switching network for setting a plurality of communication channels between terminals of subscribers, comprising:

a plurality of terminals at least one provided for each of plural subscribers; and at least two ATM switching apparatuses, each accommodating at least one of said terminals, for connecting said terminals to each other via a communication line, said ATM switching apparatuses being interconnected so as to be capable of communicating with each other;

wherein each of said terminals comprises:

means for producing at least one call originating signal containing first call information indicating that a plurality of communication channels are to be set between a terminal of interest and another terminal, and means for setting second call information designating each of said plural communication channels to said call originating signal;

wherein one of said ATM switching apparatuses accommodating said terminal of interest comprises:

means for setting all of said plurality of communication channels between said terminal of interest and said one of said ATM switching apparatuses accommodating said terminal of interest in response to said call originating signal, and means for producing another call originating signal having said first call information and said second call information and sending out said another call originating signal to one of said ATM switching apparatuses accommodating said another terminal; and wherein said one of said ATM switching apparatuses accommodating said another terminal comprises:

means for setting all of said plurality of communication channels between said one of said ATM switching apparatuses accommodating said another terminal and said another terminal in response to said another call originating signal.

5. An ATM switching network for setting a plurality of communication channels between terminals of subscribers, comprising:

a plurality of terminals at least one provided for each of plural subscribers; and at least two ATM switching apparatuses, each accommodating at least one of said terminals, for connecting said terminals to each other via a communication line, said ATM switching apparatuses being interconnected so as to be capable of communicating with each other;

wherein each of said terminals comprises:

means for producing at least one call originating signal containing first call information indicating that a plurality of communication channels are set between a terminal of interest and another terminal, means for setting second call information designating each of said plural communication channels to said call originating signal, setting of said plural communication channels being requested by said terminal of interest, and means for setting third call information for designating each of said plural communication channels to said call originating signal;

wherein one of said the ATM switching apparatuses accommodating said terminal of interest comprises:

means for setting all of said plurality of requested communication channels between said terminal of interest and said one of said ATM switching apparatuses accommodating said terminal of interest in response to said first call information contained in said call originating signal supplied from said terminal of interest, means for measuring a total traffic amount per unit time in said plurality of set communication channels in response to said first call information, means for limiting the traffic of said plurality of set communication channels in such a manner that the measured total traffic amount becomes lower than, or equal to, the total traffic amount indicated by said third call information, and means for producing another call originating signal having said first call information, said second call information and said third call information and sending out said another call originating signal to one of said ATM switching apparatuses accommodating said another terminal; and wherein said one of said ATM switching apparatuses accommodating said another terminal comprises:

means for setting all of said plurality of communication channels between said one of said ATM switching apparatuses accommodating said another terminal and said another terminal in response to said another call originating signal.

6. An ATM switching network as claimed in claim 5 wherein said means for measuring the total traffic amount comprises:

means for multiplexing cells sent from said terminal of interest in said plurality of set communication channels; and means for measuring a traffic amount of the multiplexed cell per unit time.

7. An ATM switching network as claimed in claim 5, further comprising:

at least one transit ATM switching network arranged between said at least two ATM switching apparatuses.

8. An ATM switching apparatus for use in an ATM switching network for connecting a plurality of subscriber terminals to each other via a communication line, for accommodating a terminal of at least one subscriber, comprising:

means for setting a plurality of communication channels between said terminal of at least one subscriber and another terminal of another subscriber, in response to first call information indicative of setting of said plural communication channels between said terminal of of at least one subscriber and said another terminal, said first call information being set in at least one call originating signal supplied from said terminals of at least one subscriber;

means for measuring, when said first call information is set in at least one call originating signal supplied from said terminal of at least one subscriber, a total traffic amount per unit time in said plurality of communication channels; and means for limiting traffic of said plurality of communication channels set between said terminal of at least one subscriber and said another terminal of another subscriber such that said measured traffic amount becomes lower than, or equal to, a traffic predetermined amount, in response to second call information representative of a total traffic amount per unit time of said plurality of communication channels, said second call information being set in at least one call originating signal supplied from said terminal of at least one subscriber.

9. An ATM switching network for setting a plurality of communication channels between terminals of subscribers, comprising:

a plurality of terminals at least one provided for each of plural subscribers; and an ATM switching apparatus accommodating said terminals, for connecting said terminals to each other via a communication line;

wherein each of said terminals comprises:

means for producing at least one call originating signal containing first call information indicating that a plurality of communication channels are set between a terminal of interest and another terminal, and means for setting second call information representative of a total traffic amount per unit time of said plural communication channels to said call originating signal;

wherein said ATM switching apparatus comprises:

means, responsive to said first call information contained in said call originating signal supplied from said terminal of interest, for measuring said total traffic amount per unit time in said plurality of communication channels, means for limiting the traffic of said plurality of communication channels in such a manner that the measured total traffic amount becomes lower than, or equal to the total traffic amount of said second call information, means for setting said plurality of communication channels between said ATM switching apparatus and said terminal of interest in response to said call originating signal, means for producing another call originating signal setting therein said first call information and said second call information and sending out said another call originating signal to said another terminal, and means for setting said plurality of communication channels between the ATM switching apparatus and said another terminal.

10. An ATM switching network as claimed in claim 9 wherein said means for measuring the total traffic amount comprises:
- means for multiplexing cells sent from said terminal of interest in said plurality of set communication channels; and
- means for measuring a traffic amount of the multiplexed cell per unit time.

11. An ATM switching network for setting a plurality of communication channels between terminals of subscribers, comprising:
- a plurality of terminals at least one provided for each of plural subscribers; and
- an ATM switching apparatus accommodating said terminals, for connecting said terminals to each other via a communication line;
- wherein each of said terminals comprises:
  - means for producing at least one call originating signal containing first call information indicating that a plurality of communication channels are set between a terminal of interest and another terminal, and
  - means for setting second call information designating each of said plural communication channels to said call originating signal, said plural communication channels being set by said terminal of interest;
- wherein said ATM switching apparatus comprises:
  - means for setting all of said plurality of communication channels between said terminal of interest and said ATM switching apparatus in response to said call originating signal, and
  - means for producing another call originating signal having said first call information and said second call information and sending out said another call originating signal to said another terminal; and
- wherein said ATM switching apparatus comprises:
  - means for setting all of said plurality of communication channels between the ATM switching apparatus and said another terminal in response to said call originating signal.

12. An ATM switching network for setting a plurality of communication channels between terminals of subscribers, comprising:
- a plurality of terminals at least one provided for each of plural subscribers; and
- an ATM switching apparatus accommodating said terminals, for connecting said terminals to each other via a communication line,
- wherein each of said terminals comprises:
  - means for producing at least one call originating signal containing first call information indicating that a plurality of communication channels are set between a terminal of interest and another terminal, and
  - means for setting second call information designating each of said plural communication channels to said call originating signal, said plural communication channels being set by said terminal of interest, and
  - means for setting third call information representative of a total traffic amount per unit time of said plurality of set communication channels to said call originating signal;
- wherein said ATM switching apparatus comprises:
  - means for setting all of said plurality of communication channels between said terminal of interest and said ATM switching apparatus in response to said first call information contained in said call originating signal supplied from said terminal of interest,
  - means for measuring said total traffic amount per unit time in said plurality of set communication channels in response to said first call information,
  - means for limiting the traffic of said plurality of set communication channels in such a manner that the measured total traffic amount is lower than, or equal to, the total traffic amount indicated by said third call information, and
  - means for producing another call originating signal having said first call information, said second call information, and said third call information and sending out said another call originating signal to said another terminal; and
- wherein said ATM switching apparatus comprises:
  - means for setting all of said plurality of communication channels between said ATM switching apparatus and said another terminal in response to said call originating signal.

13. An ATM switching network as claimed in claim 12 wherein said means for measuring the total traffic amount comprises:
- means for multiplexing a cell sent from said terminal of interest in said plurality of set communication channels; and
- means for measuring a traffic amount of the multiplexed cell per unit time.

* * * * *